United States Patent

Itoh et al.

[11] Patent Number: 4,740,063
[45] Date of Patent: Apr. 26, 1988

[54] TELEPHOTO ZOOM LENS SYSTEM

[75] Inventors: Takayuki Itoh; Hirofumi Matsuo, both of Saitama, Japan

[73] Assignee: Asahi Kogaku Kogyo Kabushiki Kaisha, Tokyo, Japan

[21] Appl. No.: 648,272

[22] Filed: Sep. 6, 1984

[30] Foreign Application Priority Data

Sep. 14, 1983 [JP]  Japan ................ 58-169576

[51] Int. Cl.⁴ .............................................. G02B 15/14
[52] U.S. Cl. ..................................... 350/427; 350/423
[58] Field of Search ............................... 350/423, 427

[56] References Cited
U.S. PATENT DOCUMENTS

| | | | |
|---|---|---|---|
| 4,017,161 | 4/1977 | Tsuji | 350/427 |
| 4,372,654 | 2/1983 | Fujioka et al. | 350/427 |
| 4,395,092 | 7/1983 | Itoh | 350/427 |
| 4,468,098 | 8/1984 | Itoh | 350/427 |

Primary Examiner—John K. Corbin
Assistant Examiner—Scott J. Sugarman
Attorney, Agent, or Firm—Lyon & Lyon

[57] ABSTRACT

A telephoto zoom lens system comprises eleven lens elements including a fourth lens group (relay lens system) of a three-group three-element arrangement. The telephoto zoom lens system covers a range of from quasi-telephoto setting to telephoto setting, has a zoom ratio ranging from about 2.5 to 3, and an F number ranging from 4 to 4.5.

4 Claims, 8 Drawing Sheets (a)

(b)

(c)

(a)

(a)

(b)

(c)

TELEPHOTO ZOOM LENS SYSTEM

BACKGROUND OF THE INVENTION

The present invention relates to a four-group telephoto zoom lens system for use with 35-mm photographic cameras which covers a range of from quasi-telephoto setting to telephoto setting, has a zoom ratio ranging from about 2.5 to 3, and an F number ranging from 4 to 4.5.

Many telephoto zoom lenses of the class and type described have been known. The known telephoto zoom lens systems are composed of twelve lenses or more.

SUMMARY OF THE INVENTION

It is an object of the present invention to provide a telephoto zoom lens system which is compact in size and has good performance.

A telephoto zoom lens system of the present invention comprises eleven lens elements including a fourth lens group (relay lens system) of a three-group three-element arrangement.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
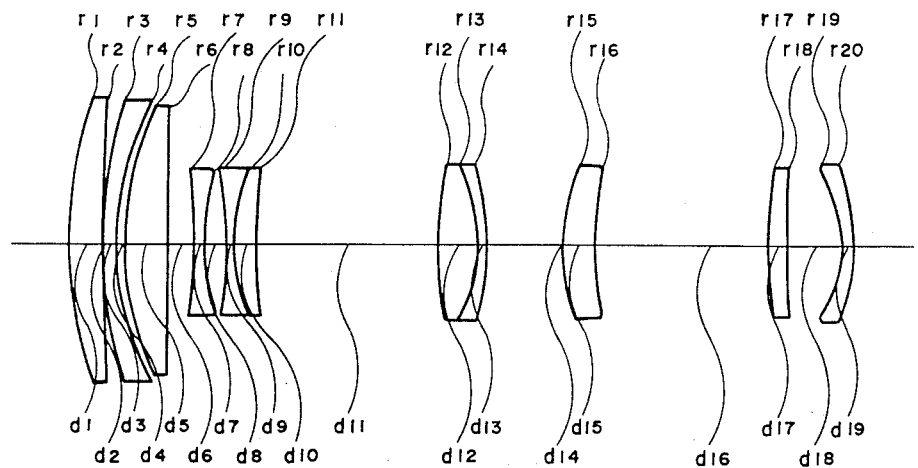
FIGS. 1, 3, 5 and 7 are views showing lens systems, on a short-focal-length setting, according to Examples 1, 2, 3 and 4, respectively, of the present invention.
Figure 2:
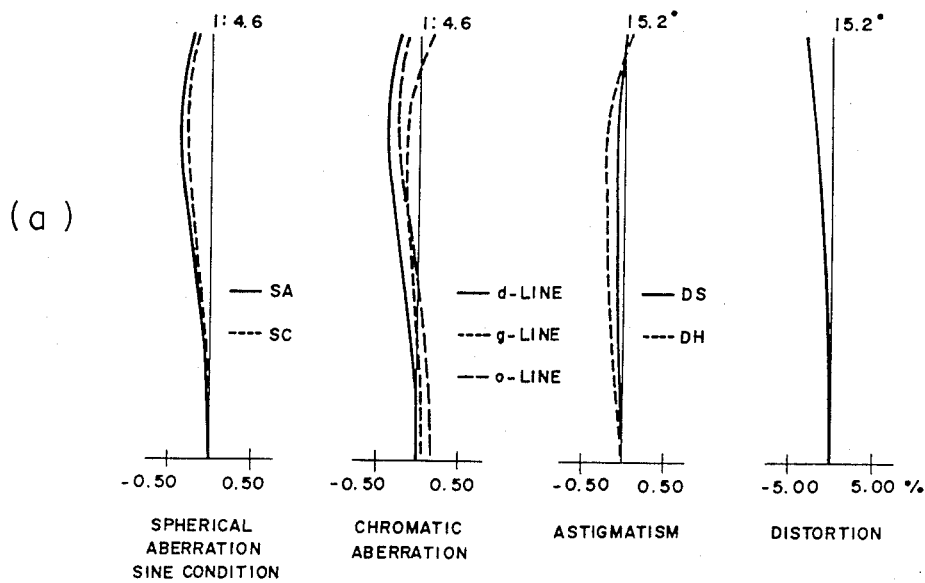
FIGS. 2, 4, 6 and 8 are diagrams illustrative of aberrations of the lens systems of Examples 1, 2, 3 and 4, respectively, (a) showing aberrations on a short-focal-length setting, (b) aberrations on an intermediate-focal-length setting, and (c) aberrations on a long-focal-length setting.
Figure 2:
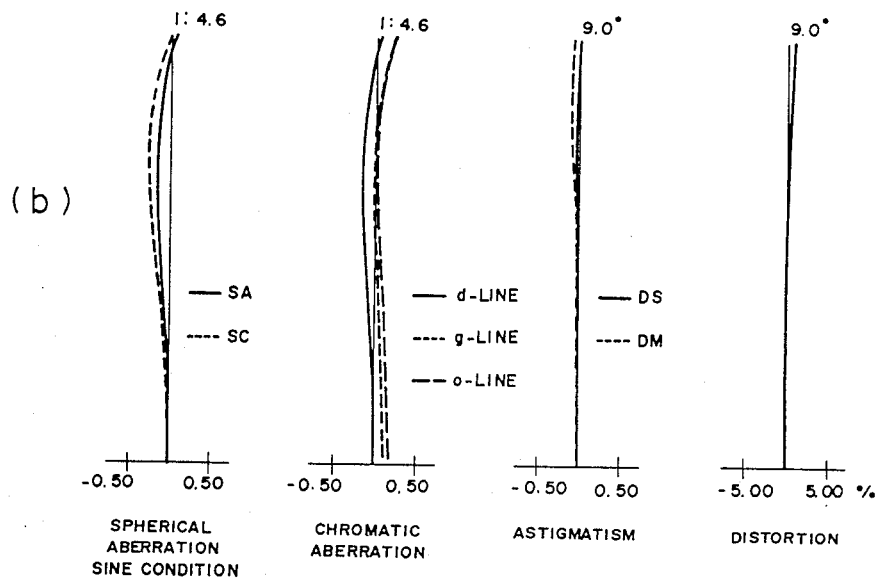
Figure 2:
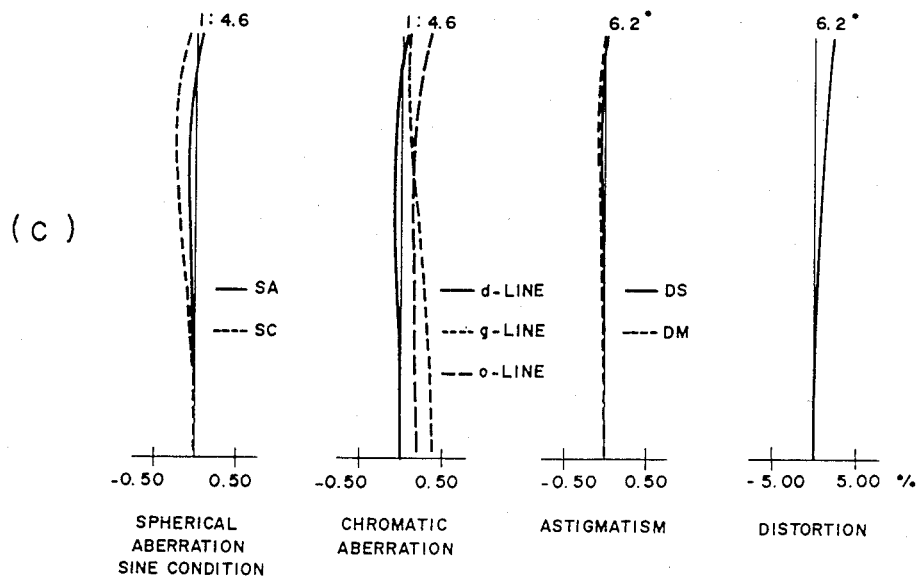
Figure 3:
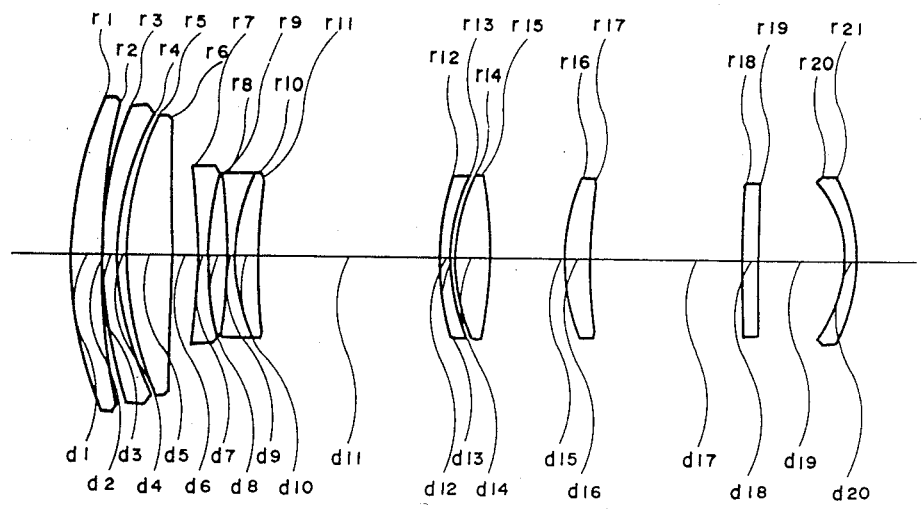
Figure 4:
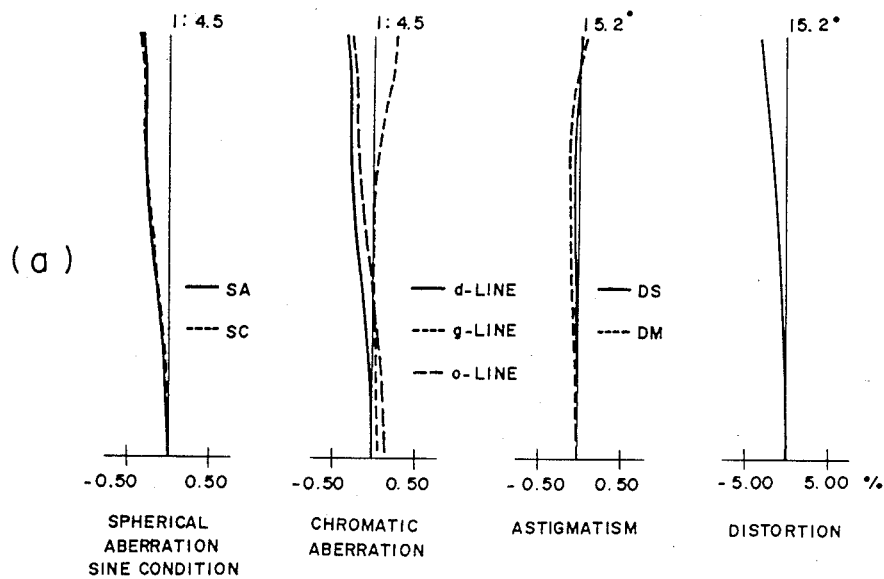
Figure 4:
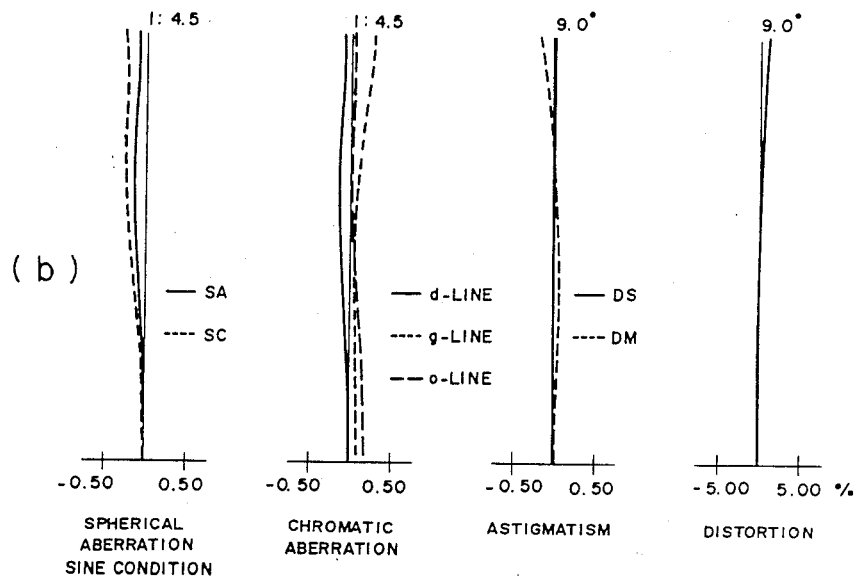
Figure 4:
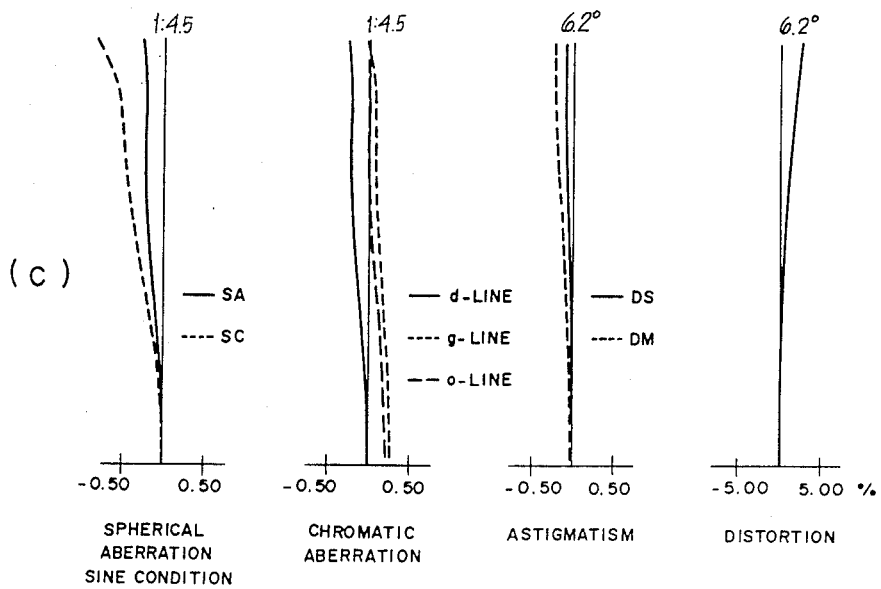
Figure 5:
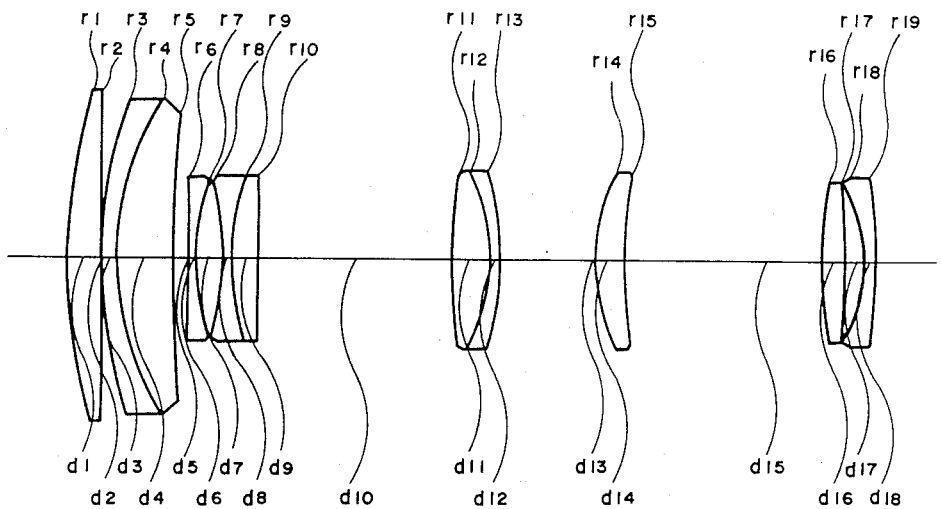
Figure 6:
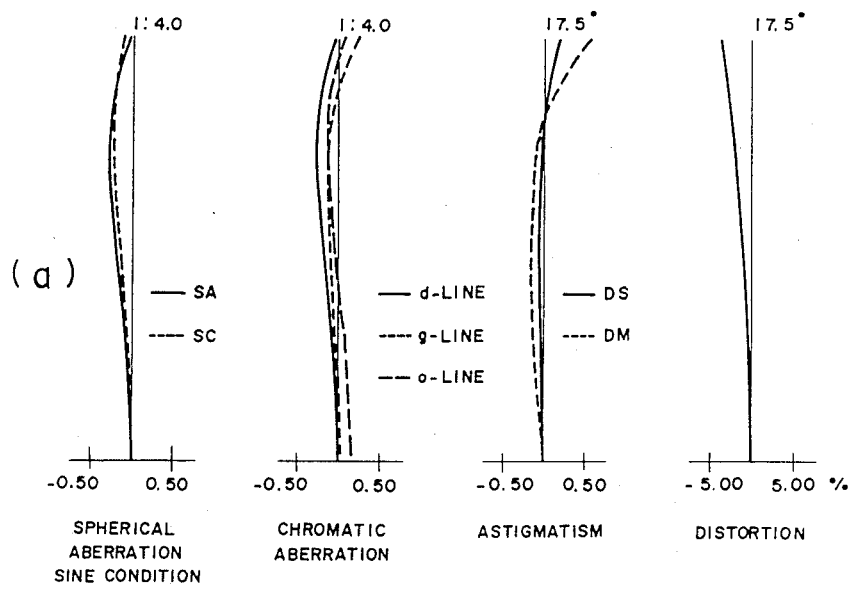
Figure 6:
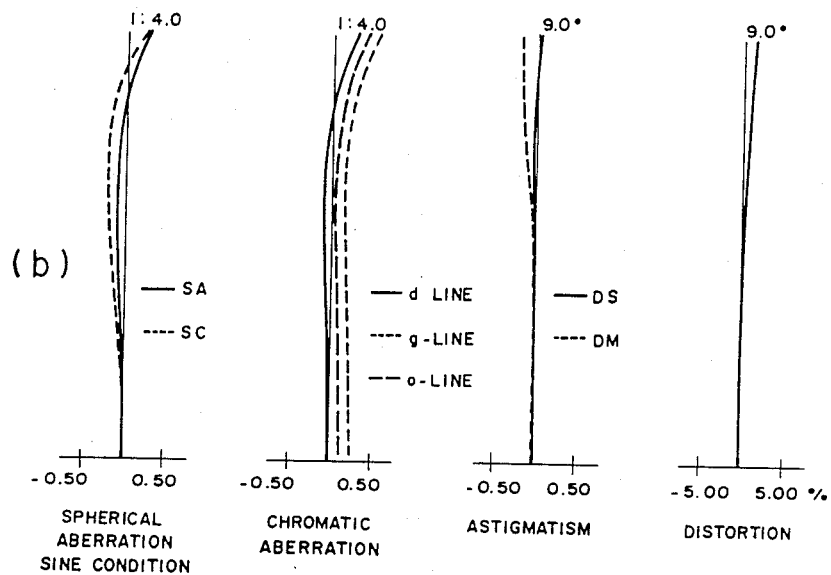
Figure 6:
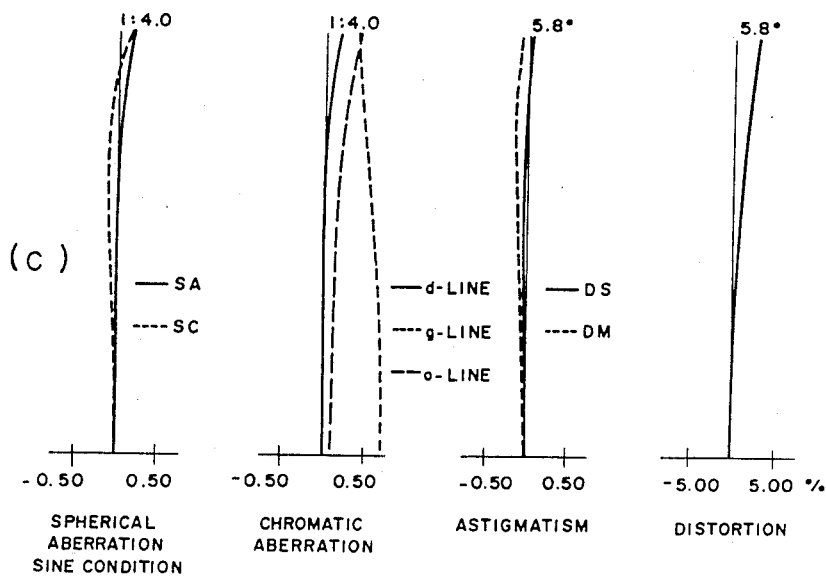
Figure 7:
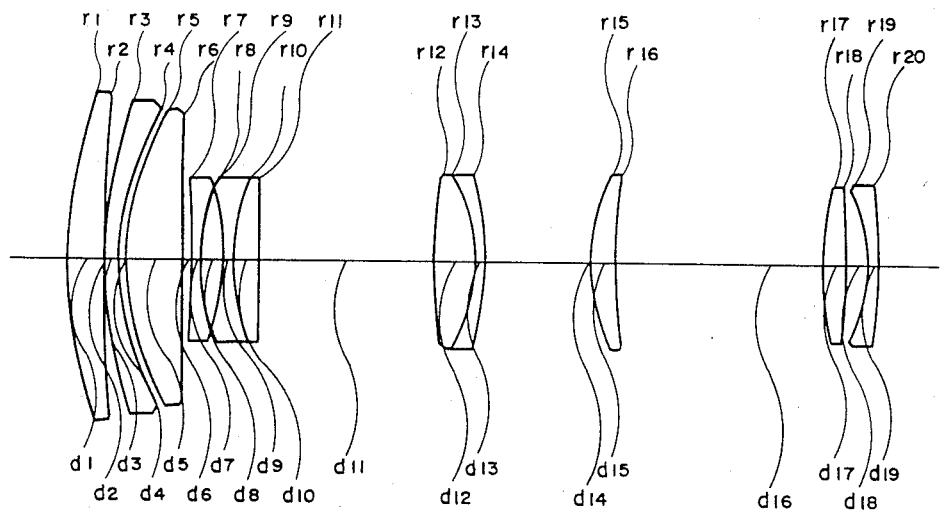
Figure 8:
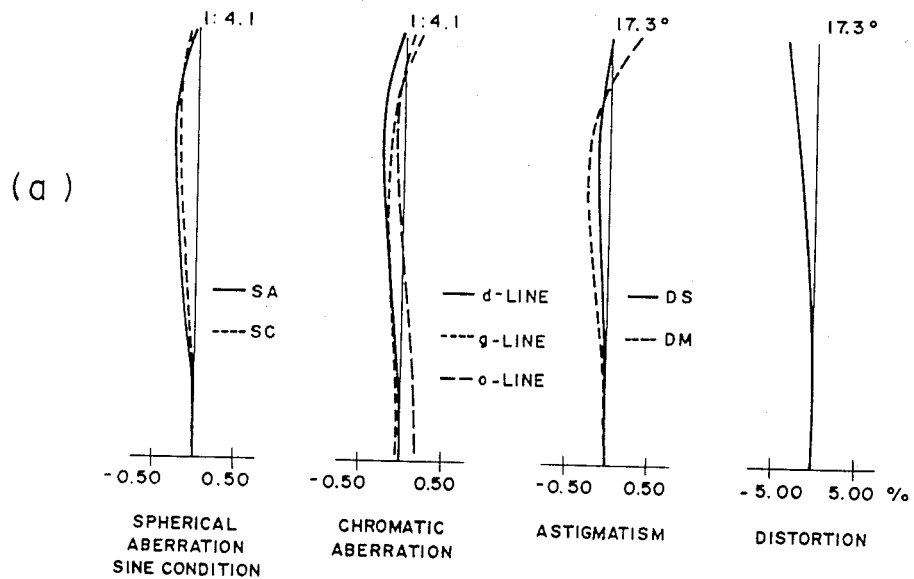
Figure 8:
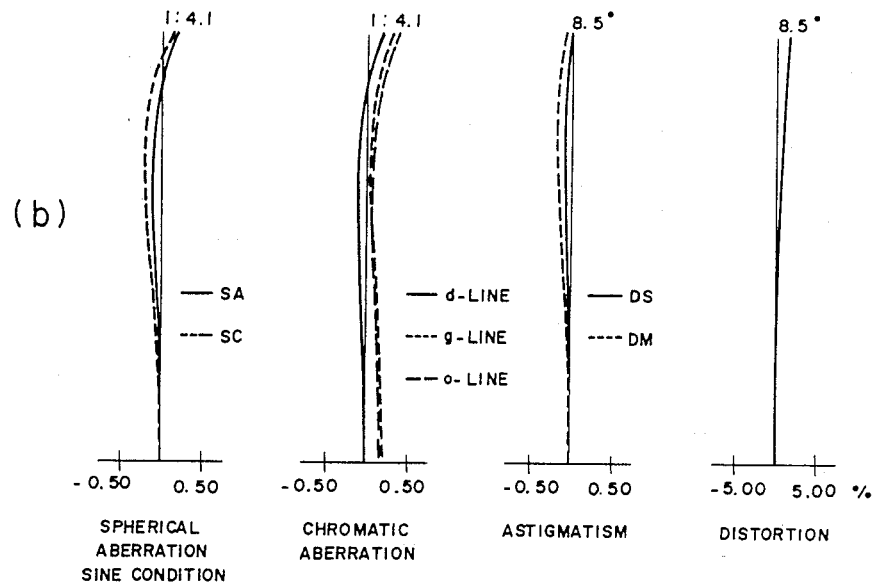
Figure 8:
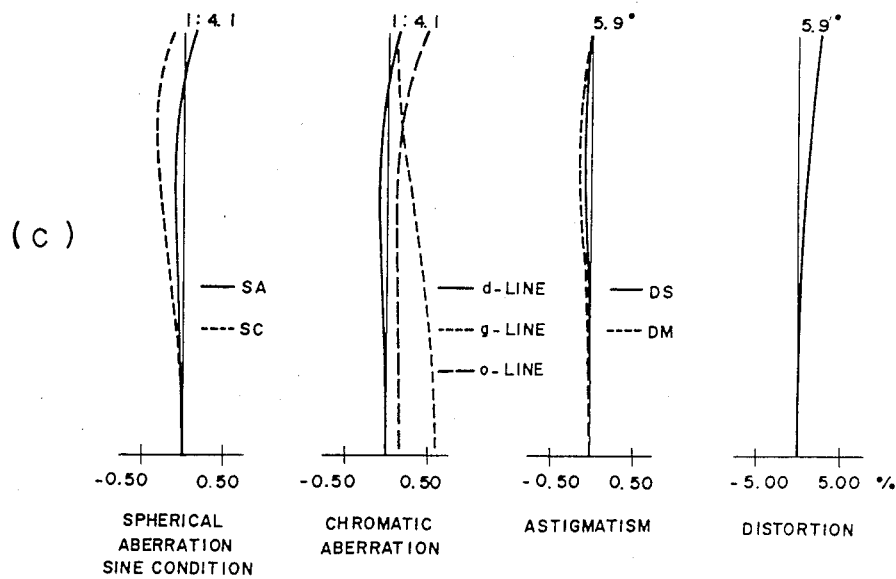

A telephoto zoom lens system according to the present invention comprises, in order from an object, a variable-power lens system composed of a first lens group having a positive focal length for focusing, a second lens group having a negative focal length and serving as a variator for primarily effecting power variation, and a third lens group having a positive focal length and serving as a compensator for keeping a constant image surface, and a relay lens system composed of a fourth lens group following the variable-power lens system, the first lens group comprising a positive lens, a negative-meniscus lens having a convex surface facing the object, and a positive lens, the second lens group comprising a negative lens and a compound lens composed of a double-concave negative lens and a positive lens, the third lens group comprising a double-convex positive lens and a negative-meniscus lens or a negative-meniscus lens and a double-convex positive lens and including adjacent surfaces (cemented surfaces in the compound lens) having a large curvature, the fourth lens group comprising a lens (a) composed of a single positive lens having a convex surface facing the object and a lens group (b) spaced from the lens (a) and composed of a positive lens and a negative-meniscus lens having a concave surface facing the object, the telephoto zoom lens system meeting the following conditions:

(1) $0.1 < |r_{IIIM}|/f\,max < 0.21$
(2) $0.23 < N_{III\eta} - N_{IIIp}$
(3) $30 < \nu_{IIIp} - \nu_{III\eta}$
(4) $1.0 < f\,max/f_{IVa} < 2.9$
(5) $0.1 < r_{IVal}/f\,max < 0.21$
(6) $61 < \nu_{IVa}$ where f max: the focal length of the entire lens system on a long-focal-length setting;

$r_{IIIM}$: the average of radii of curvature of adjacent surfaces of positive and negative lenses of the third lens group (or cemented surfaces of the compound lens);

$N_{IIIp}$: the refractive index at d-line of the positive lens in the third lens group;

$N_{III\eta}$: the refractive index at d-line of the negative-meniscus lens in the third lens group;

$\nu_{IIIp}$: the Abbe number of the positive lens in the third lens group;

$\nu_{III\eta}$: the Abbe number of the negative-meniscus lens in the third lens group;

$f_{IVa}$: the focal length of the lens (a) (single lens) in the fourth lens group;

$f_{IVal}$: the radius of curvature of the surface facing the object of the lens (a) in the fourth lens group; and $\nu_{IVa}$: the Abbe number of the lens (a) in the fourth lens group.

The above conditions will now be described.

The conditions (1), (2) and (3) are concerned with the third lens group. Since the lens (a) closer to the object of the fourth lens group is composed of a single positive lens, as described above, the lens (a) facing the object has a large curvature and a large positive refractive power. No achromatic correction can be performed in the lens (a) in the fourth lens group. For achromatic correction, it is necessary to increase the negative refractive power of the third lens group, and hence the curvature of adjacent surfaces of the positive and negative lenses of the third lens group (cemented surface of the compound lens) has to be increased.

If the upper limit of the condition (1) were exceeded, the negative refractive power of the third lens group would be reduced so that spherical aberration caused by the object-facing surface of the lens (a) of the fourth lens group could not be corrected. Therefore, the lens (a) of the fourth lens group could not be composed of a single lens, thus failing to achieve the object of the present invention. If the lower limit of the condition (1) were exceeded, the negative refractive power of the third lens group would become too strong, resulting in a greater tendency to produce higher-order aberrations and poor balance between aberrations such as spherical aberration and chromatic aberration.

If the lower limit of the condition (2) were exceeded, the negative refractive power of the third lens group would be increased and the lower limit of the condition (1) would tend to be easily exceeded, so that higher-order aberrations and the balance between aberrations could not be corrected well.

The condition (3) is required to correct chromatic aberration within the ranges of the conditions (1) and (2) regardless of the fact that the lens (a) in the fourth lens group comprises a single positive lens.

The conditions (4), (5) and (6) are directed to the lens (a) in the fourth lens group.

Heretofore, the lens (a) in the fourth lens group has been composed of two lenses or more, and the power of the positive lens group closer to the object has been so great that the upper limit of the condition (4) has been exceeded. With the present invention, the lens (a) in the fourth lens group comprises a single positive lens, and if such a single lens were composed of a lens having a large power exceeding the upper limit of the condition (4), it would be difficult to correct aberrations such as spherical aberration. If the lower limit of the condition (4) were exceeded, it would become easier to correct aberrations, but the lens system could not be rendered compact in size.

The condition (5) serves to provide good balance with the condition (1). The positive refractive power would be small and no desired balance could be achieved with a large radius of curvature exceeding the upper limit of the condition (4) within the range of the condition (4). If the lower limit of the condition (5) were exceeded, the positive refractive power would excessively be large, tending to exceed the lower limit of the condition (1), with resulting problems of higher-order aberrations and poor balance between aberrations.

If the lower limit of the condition (6) were exceeded, chromatic aberration would become difficult to correct since the lens (a) in the fourth lens group comprises a single lens.

Examples 1 through 4 of the present invention will be given hereinbelow. Designated in Examples 1 through 4 at f is a focal length, $f_B$ a back focus, $\omega$ a half angle of view, r a radius of curvature of each lens surface, d a lens thickness or a distance between lens surfaces, N a refractive index at d-line of each lens, and $\nu$ an Abbe number of each lens.

[Example 1]

1:4.6   f = 82.3 − 195
$f_B$ = 57.4   $\omega$ = 15.2 − 6.2

| Surface No. | r | d | N | $\nu$ |
|---|---|---|---|---|
| 1 | 72.950 | 5.79 | 1.51633 | 64.1 |
| 2 | 355.189 | 0.10 | | |
| 3 | 80.578 | 2.30 | 1.80518 | 25.4 |
| 4 | 49.700 | 1.35 | | |
| 5 | 53.000 | 7.19 | 1.51633 | 64.1 |
| 6 | 1942.416 | 4.61 − 39.0 | | |
| 7 | −101.200 | 1.70 | 1.60311 | 60.7 |
| 8 | 44.700 | 3.58 | | |
| 9 | −75.438 | 1.50 | 1.60311 | 60.7 |
| 10 | 34.820 | 3.80 | 1.80518 | 25.4 |
| 11 | 140.793 | 30.90 − 1.59 | | |
| 12 | 81.685 | 6.71 | 1.48749 | 70.1 |
| 13 | −28.980 | 1.60 | 1.80518 | 25.4 |
| 14 | −46.500 | 12.77 − 7.7 | | |
| 15 | 32.725 | 5.64 | 1.48749 | 70.1 |
| 16 | 65.243 | 29.41 | | |
| 17 | 88.200 | 3.19 | 1.52310 | 50.8 |
| 18 | 727.416 | 9.24 | | |
| 19 | −23.500 | 1.90 | 1.54072 | 47.2 |
| 20 | −38.823 | | | |

$|r_{IIIM}|/f$ max=0.149
$N_{III\eta}-N_{IIIp}=0.318$
$\nu_{IIIp}-\nu_{III\eta}=44.7$
f max/$f_{IVa}$=1.53
$r_{IVal}/f$ max=0.168
$\nu_{IVa}=70.1$

[Example 2]

1:4.5   f = 82.3 − 195
$f_B$ = 55.3   $\omega$ = 15.2 − 6.2

| Surface No. | r | d | N | $\nu$ |
|---|---|---|---|---|
| 1 | 60.478 | 5.65 | 1.51633 | 64.1 |
| 2 | 127.701 | 0.10 | | |
| 3 | 70.609 | 2.30 | 1.80518 | 25.4 |
| 4 | 46.178 | 1.79 | | |
| 5 | 52.891 | 7.67 | 1.51633 | 64.1 |
| 6 | −726.894 | 4.61 − 38.49 | | |
| 7 | −91.330 | 1.70 | 1.60311 | 60.7 |
| 8 | 50.301 | 3.14 | | |
| 9 | −96.401 | 1.50 | 1.60311 | 60.7 |
| 10 | 31.589 | 3.80 | 1.80518 | 25.4 |
| 11 | 89.234 | 30.90 − 1.61 | | |
| 12 | 47.716 | 1.60 | 1.80518 | 25.4 |
| 13 | 29.142 | 0.85 | | |
| 14 | 30.020 | 6.00 | 1.48749 | 70.1 |
| 15 | −69.620 | 12.77 − 8.17 | | |
| 16 | 32.644 | 4.13 | 1.48749 | 70.1 |
| 17 | 66.865 | 26.19 | | |
| 18 | 166.025 | 2.80 | 1.52310 | 50.8 |
| 19 | 3473.425 | 14.65 | | |
| 20 | −21.112 | 1.90 | 1.54072 | 47.2 |
| 21 | −29.070 | | | |

$|r_{IIIM}|/f$ max=0.149
$N_{III\eta}-N_{IIIp}=0.318$
$\nu_{IIIp}-\nu_{III\eta}=44.7$
f max/$f_{IVa}$=1.55
$r_{IVal}/f$ max=0.167
$\nu_{IVa}=70.1$

[Example 3]

1:4.0   f = 71.4 − 204.7
$f_B$ = 55.2   $\omega$ = 17.5 − 5.9

| Surface No. | r | d | N | $\nu$ |
|---|---|---|---|---|
| 1 | 85.928 | 5.87 | 1.51633 | 64.1 |
| 2 | 3163.754 | 0.15 | | |
| 3 | 74.621 | 2.70 | 1.80518 | 25.4 |
| 4 | 46.745 | 9.50 | 1.51633 | 64.1 |
| 5 | 270.121 | 2.61 − 43.79 | | |
| 6 | −478.136 | 1.20 | 1.60311 | 60.7 |
| 7 | 36.785 | 4.76 | | |
| 8 | −44.609 | 1.50 | 1.69680 | 55.5 |
| 9 | 41.313 | 4.50 | 1.80518 | 25.4 |
| 10 | −751.821 | 33.03 − 0.70 | | |
| 11 | 92.526 | 6.47 | 1.48749 | 70.1 |
| 12 | −29.544 | 1.70 | 1.80518 | 25.4 |
| 13 | −48.631 | 16.24 − 7.6 | | |
| 14 | 31.661 | 4.85 | 1.48749 | 70.1 |
| 15 | 90.635 | 33.59 | | |
| 16 | 76.086 | 3.88 | 1.52310 | 50.8 |
| 17 | −150.885 | 3.10 | | |
| 18 | −25.971 | 1.90 | 1.54072 | 47.2 |
| 19 | −93.715 | | | |

$|r_{IIIM}|/f$ max=0.144
$N_{III\eta}-N_{IIIp}=0.318$
$\nu_{IIIp}-\nu_{III\eta}=44.7$
f max/$f_{IVa}$=2.11
$r_{IVal}/f$ max=0.154
$\nu_{IVa}=70.1$

[Example 4]

1:4.1   f = 72.3 − 204
$f_B$ = 54.5   $\omega$ = 17.3 − 5.9

| Surface No. | r | d | N | $\nu$ |
|---|---|---|---|---|
| 1 | 78.354 | 6.27 | 1.51633 | 64.1 |
| 2 | 347.828 | 0.15 | | |
| 3 | 75.240 | 2.50 | 1.80518 | 25.4 |
| 4 | 46.483 | 1.40 | | |
| 5 | 47.917 | 9.37 | 1.51633 | 64.1 |

-continued

[Example 4]

1:4.1  $f = 72.3 - 204$
$f_B = 54.5$  $\omega = 17.3 - 5.9$

| Surface No. | r | d | N | ν |
|---|---|---|---|---|
| 6 | 4268.277 | 1.75 | — | 41.85 |
| 7 | −176.749 | 1.50 | 1.69680 | 55.5 |
| 8 | 40.860 | 3.70 | | |
| 9 | −50.569 | 1.70 | 1.69680 | 55.5 |
| 10 | 35.677 | 4.30 | 1.80518 | 25.4 |
| 11 | −1674.221 | 29.76 − 0.96 | | |
| 12 | 92.621 | 6.90 | 1.51633 | 64.1 |
| 13 | −28.076 | 1.70 | 1.80518 | 25.4 |
| 14 | −48.655 | 18.27 − 6.79 | | |
| 15 | 32.522 | 4.00 | 1.48749 | 70.1 |
| 16 | 100.000 | 35.44 | | |
| 17 | 59.821 | 3.60 | 1.51112 | 60.5 |
| 18 | −185.591 | 3.79 | | |
| 19 | −27.856 | 1.70 | 1.65844 | 50.9 |
| 20 | −101.645 | | | |

$|r_{IIIM}|/f\ max = 0.138$
$N_{III\eta} - N_{IIIp} = 0.289$
$\nu_{IIIp} - \nu_{III\eta} = 38.7$
$f\ max/f_{IVa} = 2.11$
$r_{IVal}/f\ max = 0.159$
$\nu_{IVa} = 70.1$ Although certain preferred embodiments have been shown and described, it should be understood that many changes and modifications may be made therein without departing from the scope of the appended claims.

What is claimed is:

1. A telephoto zoom lens system comprising, in order from an object, a variable-power lens system composed of a first lens group having a positive focal length for focusing, a second lens group having a negative focal length and serving as a variator for primarily effecting power variation, a third lens group having a positive focal length and serving as a compensator for keeping a constant image surface, and a relay lens system composed of a fourth lens group following the variable-power lens system, the first lens group comprising a positive lens, a negative-meniscus lens having a convex surface facing the object, and a positive lens, the second lens group comprising a negative lens and a compound lens composed of a double-concave negative lens and a positive lens, the third lens group comprising in order from an object a negative-meniscus lens and a double-convex positive lens and including adjacent surfaces having a large curvature, the fourth lens group comprising a lens (a) composed of a single positive lens having a convex surface facing the object and a lens group (b) spaced from the lens (a) and composed of a positive lens and a negative-meniscus lens having a concave surface facing the object.

2. A telephoto zoom lens system comprising, in order from an object, a variable-power lens system composed of a first lens group having a positive focal length for focusing, a second lens group having a negative focal length and serving as a variator for primarily effecting power variation, a third lens group having a positive focal length and serving as a compensator for keeping a constant image surface, and a relay lens system composed of a fourth lens group following the variable-power lens system, the first lens group comprising a positive lens, a negative-meniscus lens having a convex surface facing the object, and a positive lens, the second lens group comprising a negative lens and a compound lens composed of a double-concave negative lens and a positive lens, the third lens group comprising a double-convex positive lens and a negative-meniscus lens and including adjacent surfaces having a large curvature, the fourth lens group consisting of lens (a) composed of a single positive lens having a convex surface facing the object and a lens group (b) spaced from the lens (a) and composed of a positive lens and a negative-meniscus lens having a concave surface facing the object.

3. A telephoto zoom lens system comprising, in order from an object, a variable-power lens system composed of a first lens group having a positive focal length for focusing, a second lens group having a negative focal length and serving as a variator for primarily effecting power variation, a third lens group having a positive focal length and serving as a compensator for keeping a constant image surface, and a relay lens system composed of a fourth lens group following the variable-power lens system, the third lens group comprising a double-convex positive lens and a negative-meniscus lens and including adjacent surfaces having a large curvature, the fourth lens group comprising a lens (a) composed of a single positive lens having a convex surface facing the object and a lens group (b) spaced from the lens (a) and composed of a positive lens and a negative-meniscus lens having a concave surface facing the object, the telephoto zoom lens system meeting the following conditions:

(1) $0.1 < |r_{IIIM}|/f\ max < 0.21$
(2) $0.23 < N_{III\eta} - N_{IIIp}$
(3) $30 < \nu_{IIIp} - \nu_{III\eta}$
(4) $1.0 < f\ max/f_{IVa} < 2.9$
(5) $0.1 < r_{IVal}/f\ max < 0.21$
(6) $61 < \nu_{IVa}$ where
  f max: the focal length of the entire lens system on a long-focal-length setting;
  $r_{IIIM}$: the average of radii of curvature of adjacent surfaces of positive and negative lenses of the third leng group;
  $N_{IIIp}$: the refractive index at d-line of the positive lens in the third lens group;
  $N_{III\eta}$: the refractive indes at d-line of the negative-meniscus lens in the third lens group;
  $\nu_{IIIp}$: the Abbe number of the positive lens in the third lens group;
  $\nu_{III\eta}$: the Abbe number of the negative-meniscus lens in the third lens group;
  $f_{IVa}$: the focal length of the lens (a) in the fourth lens group;
  $f_{IVal}$: the radius of curvature of the surface facing the object of the lens (a) in the fourth lens group; and
  $\nu_{IVa}$: the Abbe number of the lens (a) in the fourth lens group.

4. A telephoto zoom lens system comprising, in order from an object, a variable-power lens system composed of a first lens group having a positive focal length for focusing, a second lens group having a negative focal length and serving as a variator for primarily effecting power variation, a third lens group having a positive focal length and serving as a compensator for keeping a constant image surface, and a relay lens system composed of a fourth lens group following the variable-power lens system, the third lens group comprising a negative-meniscus lens and a double-convex positive lens and including adjacent surfaces having a large curvature, the fourth lens group comprising a lens (a) composed of a single positive lens having a convex surface facing the object and a lens group (b) spaced from the lens (a) and composed of a positive lens and a negative-meniscus lens having a concave surface facing the object, the telephoto zoom lens system meeting the following conditions:

(1) $0.1 < |r_{IIIM}|/f\,max < 0.21$
(2) $0.23 < N_{III\eta} - N_{IIIp}$
(3) $30 < \nu_{IIIp} - \nu_{III\eta}$
(4) $1.0 < f\,max/f_{IVa} < 2.9$
(5) $0.1 < r_{IVa1}/f\,max < 0.21$
(6) $61 < \nu_{IVa}$ where f max: the focal length of the entire lens system on a long-focal-length setting;

$r_{IIIM}$: the average of radii of curvature of adjacent surfaces of positive and negative lenses of the third leng group;

$N_{IIIp}$: the refractive index at d-line of the positive lens in the third lens group;

$N_{III\eta}$: the refractive indes at d-line of the negative-meniscus lens in the third lens group;

$\nu_{IIIp}$: the Abbe number of the positive lens in the third lens group;

$\nu_{III\eta}$: the Abbe number of the negative-meniscus lens in the third lens group;

$f_{IVa}$: the focal length of the lens (a) in the fourth lens group;

$f_{IVa1}$: the radius of curvature of the surface facing the object of the lens (a) in the fourth lens group; and $\nu_{IVa}$: the Abbe number of the lens (a) in the fourth lens group.

* * * * *